United States Patent
Tajima

(10) Patent No.: US 9,961,319 B2
(45) Date of Patent: May 1, 2018

(54) IMAGE PROCESSING APPARATUS AND CONTROL METHOD THEREOF

(71) Applicant: CANON KABUSHIKI KAISHA, Tokyo (JP)

(72) Inventor: Kaori Tajima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 140 days.

(21) Appl. No.: 15/066,715

(22) Filed: Mar. 10, 2016

(65) Prior Publication Data
US 2016/0269705 A1  Sep. 15, 2016

(30) Foreign Application Priority Data
Mar. 11, 2015 (JP) ................. 2015-048494

(51) Int. Cl.
*H04N 9/64* (2006.01)
*H04N 5/232* (2006.01)
*H04N 9/74* (2006.01)

(52) U.S. Cl.
CPC ......... *H04N 9/646* (2013.01); *H04N 5/23229* (2013.01); *H04N 9/74* (2013.01)

(58) Field of Classification Search
CPC .. H04N 9/646; H04N 5/23229; H04N 5/2621; H04N 9/74; G06T 5/008; G06T 5/003

USPC .................................................. 348/234, 239
See application file for complete search history.

(56) References Cited

U.S. PATENT DOCUMENTS

| | | | |
|---|---|---|---|
| 4,965,840 A | 10/1990 | Subbarao | |
| 2011/0142363 A1* | 6/2011 | Nojima | G06T 5/20 382/254 |
| 2011/0273620 A1* | 11/2011 | Berkovich | G06T 5/008 348/584 |
| 2015/0109303 A1* | 4/2015 | Boyadzhiev | G06T 5/50 345/426 |
| 2015/0279119 A1* | 10/2015 | Kamio | G06T 11/60 345/589 |

FOREIGN PATENT DOCUMENTS

| | | | | |
|---|---|---|---|---|
| JP | 2010-135996 A | 6/2010 | | |
| JP | 2010135996 A | * 6/2010 | ............ | H04N 5/232 |
| JP | 2010-177741 A | 8/2010 | | |
| JP | 2014-006658 A | 1/2014 | | |

* cited by examiner

*Primary Examiner* — Nhan T Tran
(74) *Attorney, Agent, or Firm* — Cowan, Liebowitz & Latman, P.C.

(57) ABSTRACT

Provided is an image processing apparatus capable of applying a pseudo-illumination effect to an image while suppressing a drop in image quality, and a control method for such an image processing apparatus. The image processing apparatus generates a correction signal for correcting sharpness of an image on the basis of illumination characteristics of the virtual light, and applies the correction signal to the image.

8 Claims, 5 Drawing Sheets

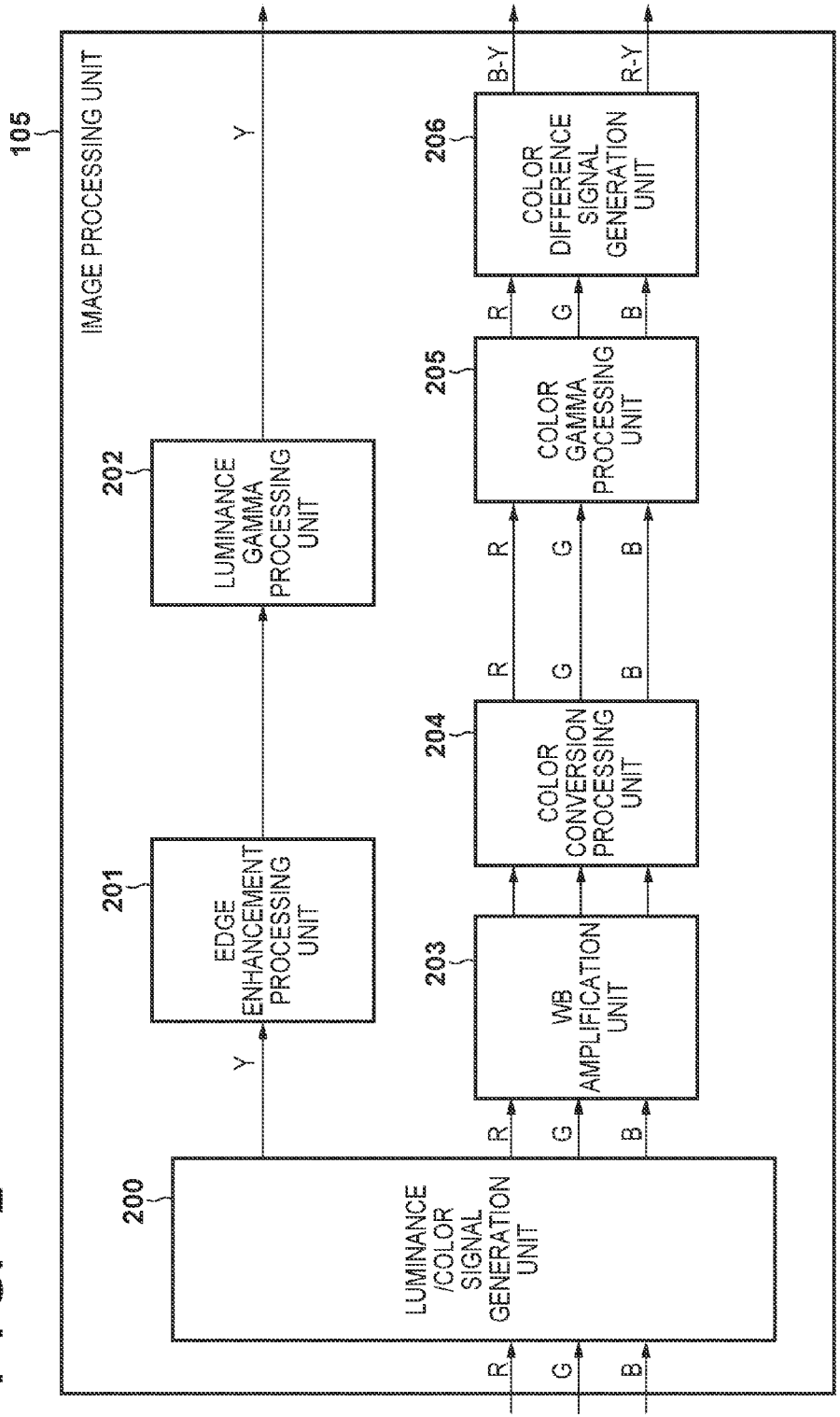

IMAGE PROCESSING APPARATUS AND CONTROL METHOD THEREOF

BACKGROUND OF THE INVENTION

Field of the Invention

The present invention relates to image processing apparatuses and control methods thereof, and particularly relates to techniques for correcting the brightness and sharpness of an image.

Description of the Related Art

A conventional technique for correcting brightness ("relighting") by illuminating an object in an image with light from a virtual light source is known (Japanese Patent Laid-Open No. 2010-135996). This technique makes it possible to brighten dark areas such as shadows produced by ambient light, which enables the image to be corrected so that an object present in blocked-out shadows, for example, can be discerned.

In the case of relighting on a facial area, for example, an area having a lower luminance than an average luminance of the overall facial area is extracted as a shadow area and the brightness of the shadow area is increased, and as a result shadows in a facial area can be suppressed without affecting the brightness of other areas.

The method disclosed in Japanese Patent Laid-Open No. 2010-135996 raises the brightness of the shadow area by increasing the gain. However, increasing the gain amplifies noise components in addition to signal components, which causes a drop in the S/N ratio of the corrected area. Japanese Patent Laid-Open No. 2010-135996 does apply a noise reduction filter in order to suppress a drop in the S/N ratio, but the noise reduction process is a smoothing process and can therefore cause a drop in the sharpness of the image.

SUMMARY OF THE INVENTION

The present invention provides an image processing apparatus capable of applying a pseudo-illumination effect to an image while suppressing a drop in image quality, and provides a control method for such an image processing apparatus.

According to an aspect of the present invention, there is provided an image processing apparatus comprising: a correction unit configured to correct the brightness of a pixel included in a virtual light illuminated area of an image; a generating unit configured to generate, on the basis of illumination characteristics of the virtual light, a correction signal for correcting sharpness of the virtual light illuminated area of the image; and an application unit configured to apply the correction signal to the image.

According to another aspect of the present invention, there is provided a control method of an image processing apparatus, the method comprising: correcting the brightness of a pixel included in a virtual light illuminated area of an image; generating on the basis of illumination characteristics of the virtual light, a correction signal for correcting sharpness of the virtual light illuminated area of the image; and applying the correction signal to the image.

According to a further aspect of the present invention, there is provided a non-transitory computer-readable storage medium storing a program that causes at least one processor to function as an image processing apparatus comprising: a correction unit configured to correct the brightness of a pixel included in a virtual light illuminated area of an image; a generating unit configured to generate, on the basis of illumination characteristics of the virtual light, a correction signal for correcting sharpness of the virtual light illuminated area of the image; and an application unit configured to apply the correction signal to the image.

Further features of the present invention will become apparent from the following description of exemplary embodiments (with reference to the attached drawings).

BRIEF DESCRIPTION OF THE DRAWINGS

FIG. 2 is a block diagram illustrating the configuration of an image processing unit according to an embodiment.

DESCRIPTION OF THE EMBODIMENTS

Exemplary embodiments of the present invention will now be described in detail in accordance with the accompanying drawings. Note that the following embodiments describe an example in which a digital camera is applied as an image processing apparatus according to the present invention. Note that "digital camera" refers to an electronic device having an image shooting function that uses a photoelectric conversion device, and thus includes any electronic device having a camera or that can use a camera, such as cellular phones, video game devices, and personal computers. However, an image shooting function is not a requirement for the present invention, and the image processing apparatus according to the present invention can be applied in any electronic device capable of processing images.

First Embodiment

Figure 1:
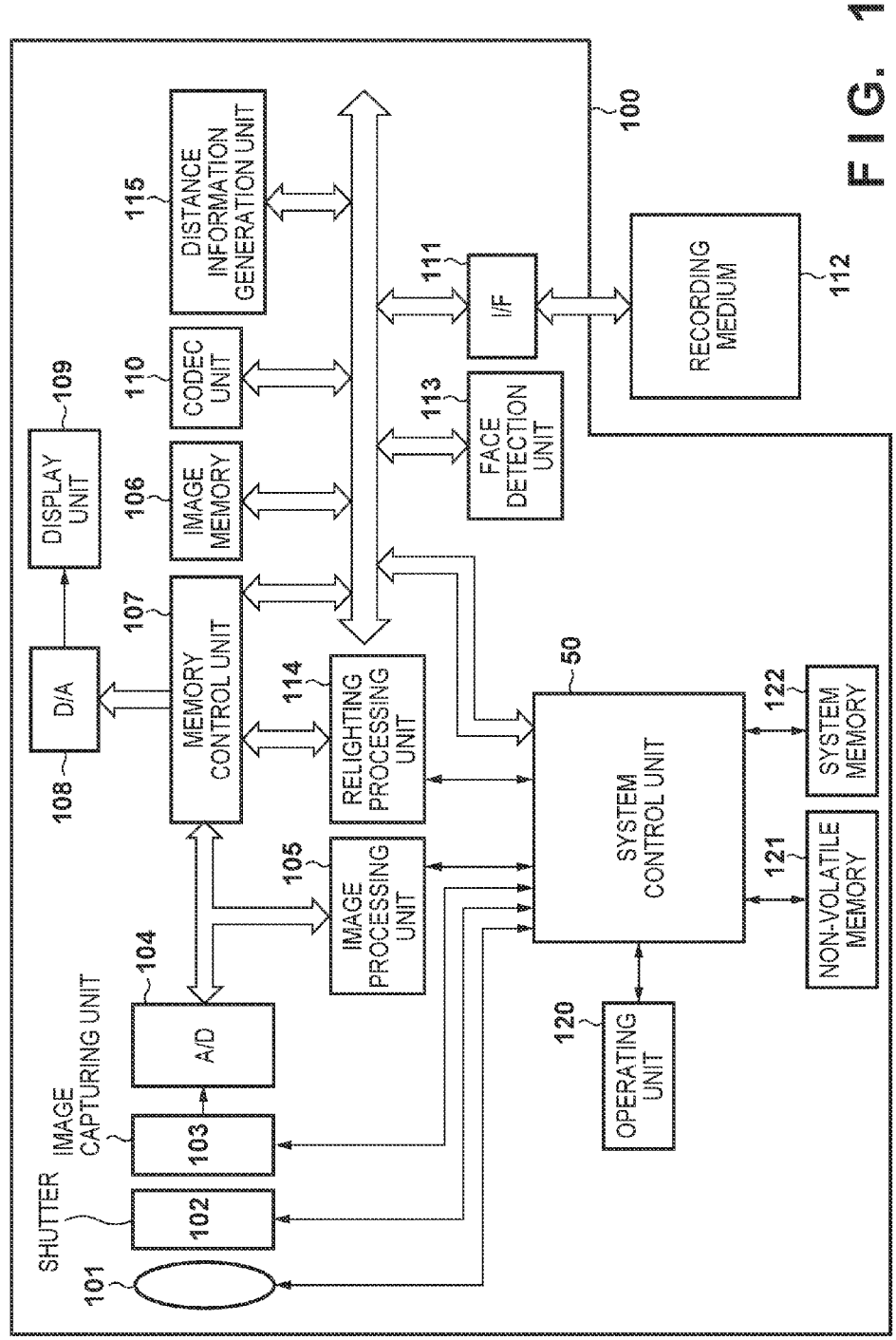
FIG. 1 is a block diagram illustrating the configuration of a digital camera according to an embodiment of the present invention.

FIG. 1 is a block diagram illustrating an example of the configuration of a digital camera 100 according to a first embodiment of the present invention.

In FIG. 1, a lens group 101 corresponds to a zoom lens including a focus lens. A shutter 102 having an aperture function is provided between the lens group 101 and an image capturing unit 103. The image capturing unit 103 has an image sensor such as a CCD/CMOS image sensor, which converts an optical image formed by the lens group 101 on an image plane into electrical signals on a pixel-by-pixel basis. An A/D converter 104 converts an analog signal output by the image capturing unit 103 into a digital signal (image data).

An image processing unit 105 carries out various types of image processing on the image data output from the A/D converter 104, such as color interpolation (demosaicing), white balance adjustment, γ correction, edge enhancement, noise reduction, color correction, and the like.

An image memory 106 temporarily stores image data. A memory control unit 107 controls reading/writing from/to the image memory 106. A D/A converter 108 converts the image data into an analog signal. A display unit 109 has a display device such as an LCD, an organic EL display, or the like, and displays various types of GUIs, live view images, images read out from a recording medium 112 and played back, and so on. A codec unit 110 encodes image data stored in the image memory 106 using a predetermined method for recording the data into the recording medium, decodes encoded image data contained in an image file to display the data, for example, and so on.

An interface (I/F) 111 mechanically and electrically connects the recording medium 112, which is a removable medium such as a semiconductor memory card, a card-type hard disk, or the like, to the digital camera 100. A system control unit 50 may be a programmable processor such as a CPU, an MPU, or the like, for example. The system control unit 50 implements functions of the digital camera 100 by executing programs recorded in, for example, a non-volatile memory 121 or an internal non-volatile memory and controlling blocks, circuits, and so on required thereby. A face detection unit 113 detects facial area(s) from a captured image. A relighting processing unit 114 carries out a relighting process that adds a pseudo-illumination effect to a shot image using a virtual light source.

A distance information generation unit 115 calculates a contrast evaluation value, an object luminance, and so on for each pixel in shot image data stored in the image memory 106, and supplies that calculated information to the system control unit 50. The distance information generation unit 115 also obtains distance information of the object from the shot image data and generates a depth map in which, for example, pixel values indicate an object distance. Furthermore, in the case where the relighting process is carried out, the distance information generation unit 115 generates a normal line map, indicating normal lines for each pixel, from the depth map of the image being processed, and supplies that normal line map to the relighting processing unit 114.

An operating unit 120 indicates a collection of buttons, switches, and so on through which a user inputs various types of instructions to the digital camera 100.

The non-volatile memory 121 is a memory that can be recorded to and erased electrically, and may be, for example, an EEPROM or the like. The non-volatile memory 121 stores various types of configuration values, GUI data, and in the case where the system control unit 50 is an MPU, a CPU, or the like, programs to be executed by the system control unit 50.

A system memory 122 is used for loading operational constants and variables of the system control unit 50, programs read out from the non-volatile memory 121, and the like.

Next, operations performed by the digital camera 100 when shooting an image will be described.

For example, the image capturing unit 103 uses the image sensor to photoelectrically convert an object image formed on the image plane by the lens group 101 when the shutter 102 is open, and the converted image is output to the A/D converter 104 as an analog image signal. The A/D converter 104 converts the analog image signal output from the image capturing unit 103 into a digital image signal (image data) and outputs the digital image signal to the image processing unit 105.

The image processing unit 105 carries out various types of image processing on the image data from the A/D converter 104 or image data from the memory control unit 107, such as color interpolation (demosaicing), γ correction, edge enhancement, noise reduction, color correction, and the like. The image processing unit 105 furthermore carries out auto white balance (AWB) adjustment using the image data obtained through the shooting.

The image data output from the image processing unit 105 is written into the image memory 106 via the memory control unit 107. The image memory 106 stores the image data output from the image capturing unit 103, image data for display in the display unit 109, and the like.

The distance information generation unit 115 calculates the contrast evaluation value, the object luminance, and so on for each pixel in the shot image data stored in the image memory 106. The distance information generation unit 115 supplies, to the system control unit 50, the contrast evaluation value, the object luminance, and so on for a focus detection region that has been set. The system control unit 50 carries out automatic focus detection (AF) on the basis of the contrast evaluation value, automatic exposure control (AE) on the basis of the object luminance, and so on. In this manner, the digital camera 100 according to the present embodiment carries out through-the-lens (TTL) autofocus (AF) processing, automatic exposure (AE) processing, and so on. The distance information generation unit 115 furthermore obtains the distance information of the object from the shot image data and generates the depth map in which, for example, pixel values indicate the object distance.

Meanwhile, the D/A converter 108 converts data for image display, stored in the image memory 106, into an analog signal and supplies the analog signal to the display unit 109. The display unit 109 carries out a display in the display device, which is an LCD or the like, based on the analog signal from the D/A converter 108.

The codec unit 110 encodes the image data recorded into the image memory 106 based on a standard such as JPEG, MPEG, or the like. The system control unit 50 forms an image file in which the encoded image data is assigned a predetermined header and the like, and records the file into the recording medium 112 via the interface 111.

Note that in current digital cameras, the display unit 109 generally functions as an electronic viewfinder (EVF) by shooting a moving picture when in a shooting standby state and continuously displaying the shot moving picture in the display unit 109. In this case, the shutter 102 is kept open, and an image is shot at, for example, 30 frames/second using what is known as an electronic shutter of the image capturing unit 103.

When a shutter button included in the operating unit 120 is then depressed halfway, the aforementioned AF and AE control is carried out; then, when the shutter button is fully depressed, a process for actually shooting the image is carried out in order to shoot a still image for recording, and the still image is recorded into the recording medium 112. In the case where an instruction is made to shoot a moving picture using a moving picture shooting button or the like, the recording of a moving picture into the recording medium 112 begins. In the present embodiment, when an image is recorded, the distance information (depth map) generated by the distance information generation unit 115 is also recorded in association therewith.

Note that the method by which the distance information generation unit 115 generates the distance information is not particularly limited, and a known method can be used. The distance information is information indicating an object distance on a pixel-by-pixel basis, and may be a depth map in which luminance values indicate distances (also called a range image, a depth image, or the like). As an example of a method of generating a depth map without using a parallax image, the object distance can be obtained on a pixel-by-pixel basis by finding, on a pixel-by-pixel basis, a focus lens position where the aforementioned contrast evaluation value is maximum. The distance information can also be found on a pixel-by-pixel basis on the basis of a correlation relationship between a defocus amount and a distance, from image data obtained by shooting the same scene multiple times while changing the in-focus distance and a point spread function (PSF) of the optical system. These techniques are disclosed in Japanese Patent Laid-Open No. 2010-177741, U.S. Pat. No. 4,965,840, and so on, for example. Meanwhile, the object distance can be obtained on a pixel-by-pixel basis using a method such as stereo matching in the case where an image sensor capable of obtaining a pair of parallax images is used.

Meanwhile, a known method, such as that disclosed in Japanese Patent Laid-Open No. 2014-6658, for example, can be used as a method for generating the normal line information of the object plane on a pixel-by-pixel basis from the depth map. The normal line information can be generated in the form of a normal line map in which RGB values of the pixels indicate normal line components, for example. While it is necessary to generate the depth map at the time of shooting (at the time of recording), the normal line map can be generated from the depth map, and thus can be generated at any desired timing, such as during the relighting process or the like.

FIG. 2 is a block diagram illustrating an example of the functional configuration of the image processing unit 105.

The image data output from the A/D converter 104 illustrated in FIG. 1 is input into a luminance/color signal generation unit 200. The image data has values for each color component in a color filter provided in the image sensor. In the case where a typical Bayer primary color filter array is used, the image data is composed of R pixel, G pixel, and B pixel data.

The luminance/color signal generation unit 200 carries out a demosaicing process on such image data so that each pixel has color signals R, G, and B, and furthermore generates a luminance signal Y from the color signals. The luminance/color signal generation unit 200 outputs the generated color signals R, G, and B to a white balance (WB) amplification unit 203, and outputs the luminance signal Y to an edge enhancement processing unit 201.

The edge enhancement processing unit 201 carries out an edge enhancement process on the luminance signal Y and outputs the processed signal to a luminance gamma processing unit 202. The luminance gamma processing unit 202 carries out gamma correction on the luminance signal Y and outputs the corrected luminance signal Y to the image memory 106.

Based on a white balance gain value computed by the system control unit 50 through a process that will be described later, the WB amplification unit 203 adjusts the white balance of the color signals R, G, and B by applying a gain thereto. A color conversion processing unit 204 converts to a desired color balance through matrix operations on the color signals R, G, and B. A color gamma processing unit 205 carries out gamma correction on the color signals R, G, and B. A color difference signal generation unit 206 generates color difference signals R-Y and B-Y from the color signals R, G, and B and outputs the generated signals to the image memory 106.

The luminance signal Y and the color difference signals R-Y and B-Y output to the image memory 106 are encoded by the codec unit 110 and ultimately recorded into the recording medium 112.

Next, operations performed by the relighting processing unit 114 will be described.

Figure 3A:
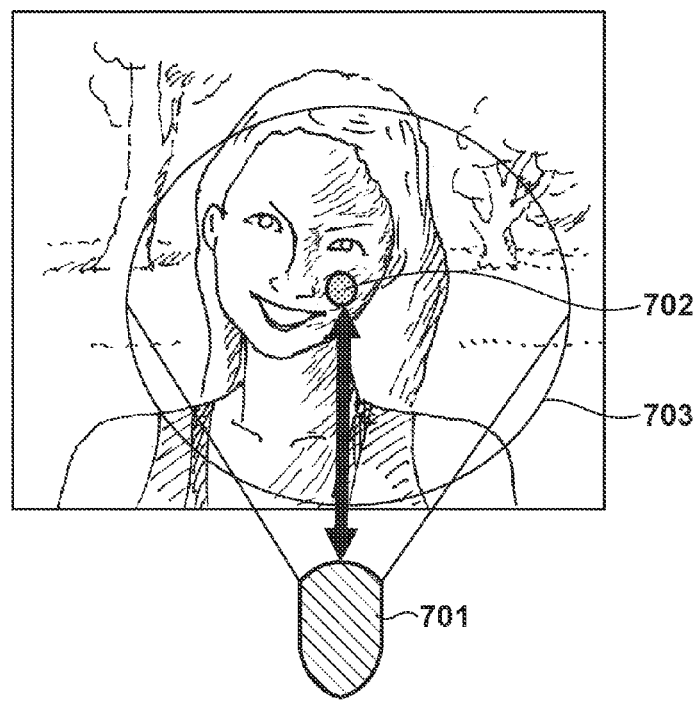
FIGS. 3A and 3B are diagrams illustrating a relationship between an object and a virtual light source according to an embodiment.
Figure 3B:
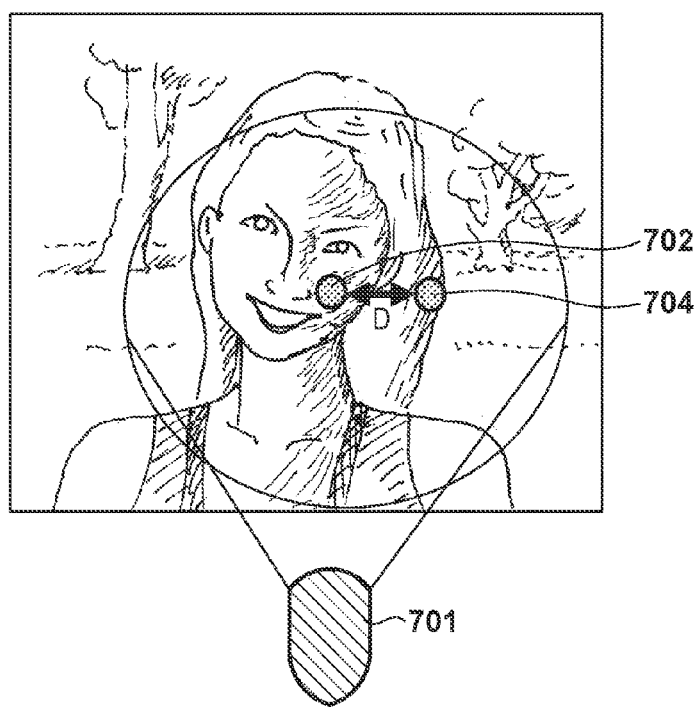

The present embodiment describes a process in which an image in which the left half (the right half, in the drawings) of the face of a person 700 is in shadow is illuminated with a virtual light source on the basis of a user instruction so as to correct the brightness of a shadow area, as illustrated in FIGS. 3A and 3B, as an example of the relighting process.

Next, the relighting process carried out on the image output from the image processing unit 105 will be described. In the present embodiment, the relighting process is executed by the relighting processing unit 114, using control parameters computed by the system control unit 50. Accordingly, first, processes for computing and setting the control parameters used in the relighting process will be described using the flowchart illustrated in FIG. 4A.

In S501, the system control unit 50 accepts an instruction to carry out the relighting process from the user through the operating unit 120. Specifically, the system control unit 50 accepts, through the operating unit 120, a user operation for selecting an item corresponding to the execution of the relighting process in a menu screen (not shown). In addition to the instruction to execute the relighting process, the system control unit 50 accepts parameters for the relighting process specified through a menu screen, for example.

To simplify the descriptions in the present embodiment, it is assumed that the position of a virtual light source, an intensity ($\alpha$) of the light source, and spread characteristics ($\beta$) of the light source are input by the user as the relighting parameters (a method in which parameters are selected from pre-set selections may be used). Assuming that the virtual light source vertically illuminates the object plane, determining the position of the virtual light source also determines a position where the light of the virtual light source (the virtual light) strikes the strongest (a central illumination position). Note that the position of the virtual light source may be information expressing a positional relationship between the virtual light source and, for example, a primary object present at the in-focus distance.

FIGS. 3A and 3B schematically illustrate an example of the virtual light source position and the central illumination position. FIGS. 3A and 3B indicate an illuminated area 703 and a central illumination position 702 of a virtual light source 701. It is assumed in the present embodiment that the virtual light from the virtual light source 701 affects only the illuminated area 703.

In S502, the system control unit 50 sets the intensity ($\alpha$) of the light source and the spread characteristics ($\beta$) of the light source instructed by the user in the relighting processing unit 114 as the control parameters.

In S503, the system control unit 50 calculates, for each pixel of the input image, a distance D between the central illumination position 702 and a target pixel 704, as indicated in FIG. 3B, associates the distances D with the corresponding pixel positions, and stores these items in the system memory 122. Note that information of the distance D for each pixel position may be set in the relighting processing unit 114 as a control parameter.

In S504, the system control unit 50 instructs the distance information generation unit 115 to generate a normal line map for the input image. The distance information generation unit 115 generates the normal line map using a known method such as that described above, from the depth map recorded in association with the data of the input image, and supplies the normal line map to the system control unit 50. The system control unit 50 stores the normal line map in the system memory 122. Note that the normal line map may be set in the relighting processing unit 114 as a control parameter.

In S505, the system control unit 50 instructs the relighting processing unit 114 to execute the relighting process.

Next, an example of the configuration of and operations performed by the relighting processing unit 114 will be described.

Figure 5:
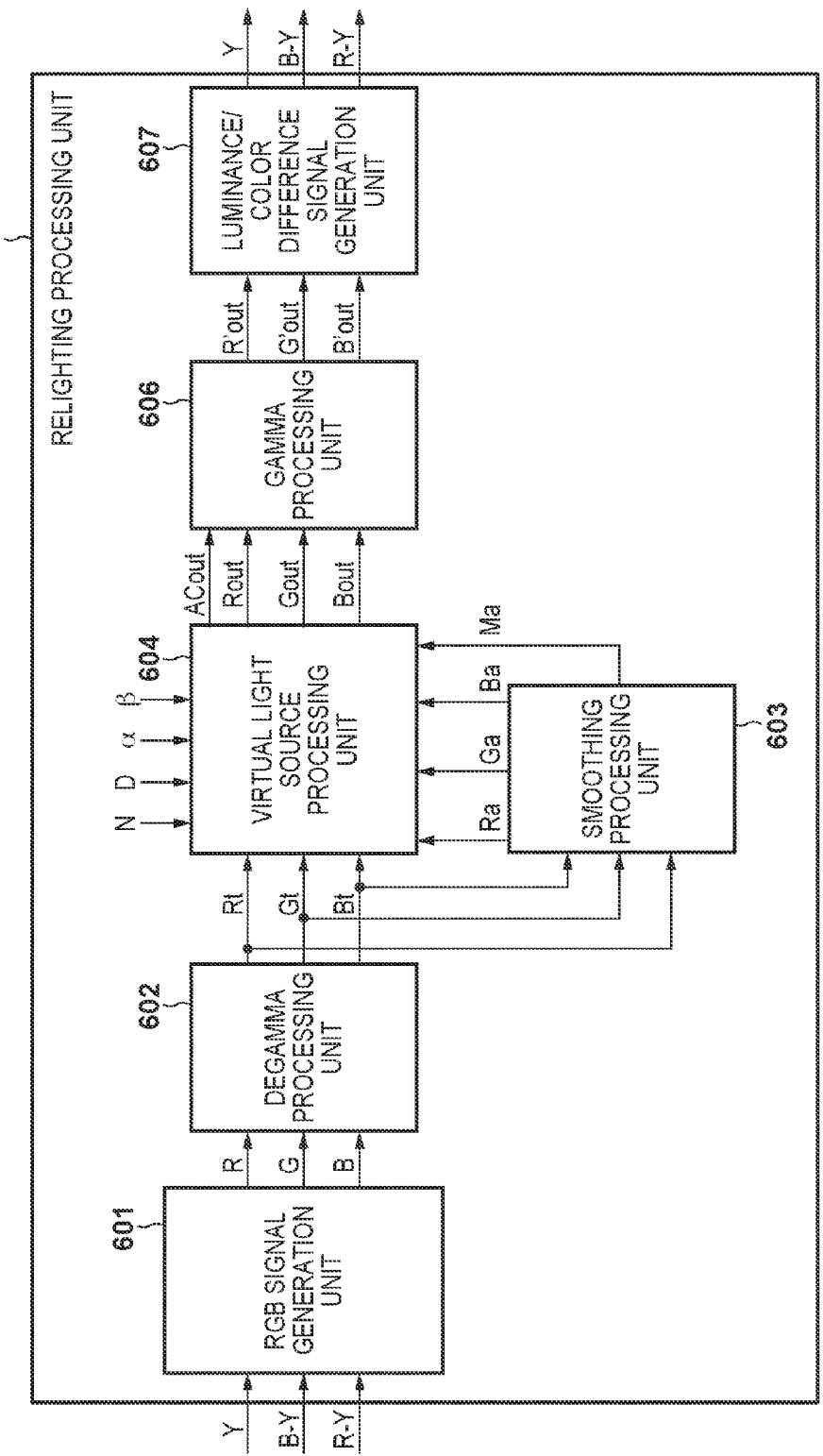
FIG. 5 is a block diagram illustrating the configuration of a relighting processing unit according to an embodiment.

FIG. 5 is a block diagram illustrating the configuration of the relighting processing unit 114. An RGB signal conversion unit 601 converts the luminance and color difference signals (Y, B-Y, R-Y) of a pixel in the input image to be processed, input from the image memory 106, into color signals (R, G, B). A degamma processing unit 602 carries out a degamma process (the inverse of the processes performed by the luminance gamma processing unit 202 and the color gamma processing unit 205), converting the signals into pre-gamma correction signal values that have linear characteristics.

A smoothing processing unit 603 applies smoothing to the color signals (R, G, B) output by the degamma processing unit 602 and outputs the smoothed signals to a virtual light source processing unit 604. The virtual light source processing unit 604 adds a lighting effect provided by the virtual light to the image (on a target pixel-by-target pixel basis).

A gamma processing unit 606 carries out gamma correction on the color signals (R, G, B) output by the virtual light source processing unit 604. A luminance/color difference signal generation unit 607 converts the gamma-corrected color signals (R, G, B) into luminance and color difference signals (Y, B-Y, R-Y) and outputs the signals to the image memory 106.

Next, operations performed by the relighting processing unit 114 will be described.

The relighting processing unit 114 reads out the luminance/color difference signals (Y, B-Y, R-Y) of the pixel of the input image, recorded into the image memory 106, that is to be processed. The RGB signal conversion unit 601 converts the input luminance/color difference signals (Y, B-Y, R-Y) into RGB signals and outputs the signals to the degamma processing unit 602.

The degamma processing unit 602 carries out operations having the reverse characteristics from the gamma characteristics applied by the luminance gamma processing unit 202 and the color gamma processing unit 205 of the image processing unit 105, converting the signals into signal values (Rt, Gt, Bt) having pre-gamma correction linear characteristics. The degamma processing unit 602 outputs the post-conversion pixel signals to the smoothing processing unit 603 and the virtual light source processing unit 604. Note that the degamma processing unit 602 may be provided in a stage previous to the RGB signal conversion unit 601 and carry out degamma processing. For example, the inverse process from the luminance gamma processing unit 202 may be applied to the Y signal, the inverse process from the color gamma processing unit 205 may be applied to the color difference signals R-Y and B-Y after returning those signals to RGB signals, and the signals may be reconverted into the color difference signals R-Y and B-Y and input into the RGB signal conversion unit 601.

The smoothing processing unit 603 smoothes the pixel signals (Rt, Gt, Bt) to be processed on a color component-by-color component basis using a function f for smoothing light source reflection color components, taking into consideration the spread characteristics (β) of the virtual light source. For example, in the present embodiment, the function f is a Gaussian function that takes the spread characteristics (β) of the virtual light source as a standard deviation, and the smoothing is carried out by applying a one-dimensional or two-dimensional Gaussian filter that approximates that Gaussian function to the pixel signal values. The higher the spread characteristics (β) and the higher the degree of spread of the virtual light, the more the signal of the light source reflection color component will be smoothed. The smoothing processing unit 603 outputs the smoothed pixel signals (Ra, Ga, Ba) to the virtual light source processing unit 604. The pixel signals (Ra, Ga, Ba) obtained through the smoothing process express ambient light reflection characteristics in the vicinity of the pixel being processed, and are used when calculating a reflection component of the virtual light.

The smoothing processing unit 603 further generates an edge compensation signal by applying, to the pixel signals (Ra, Ga, Ba) obtained through the smoothing process, a two-dimensional filter that extracts a specific frequency component corresponding to an edge portion of the image, for example. A luminance value is then calculated from the color component as an amplitude value f (Mt(x,y),β)=Ma, which is then output to the virtual light source processing unit 604.

The virtual light source processing unit 604 generates a correction signal for adding the relighting effect provided by the virtual light to the input image, and carries out a correction process using the correction signal.

Specifically, for the pixel signals (Rt, Gt, Bt) output from the degamma processing unit 602, reflection color components (Rv, Gv, Bv) in the case of illumination with the virtual light are estimated from the following:

the smoothed pixel signals (Ra, Ga, Ba) output from the smoothing processing unit 603; and the control parameters input from the system control unit 50 (position information of the virtual light source, the intensity (α) of the virtual light source, the spread characteristics (β) of the virtual light source, the distance (D) from the central illumination position of the virtual light source, and three-dimensional shape information of the object (the normal line information (N) of the object plane)).

The virtual light source processing unit 604 finds the reflection color components (Rv, Gv, Bv) through the following formulae, for example.

$$Rv(x, y) = \alpha \frac{L \cdot N(x, y)}{D^2(x, y)} f(Rt(x, y), \beta) \quad \text{Formula (1)}$$

$$Gv(x, y) = \alpha \frac{L \cdot N(x, y)}{D^2(x, y)} f(Gt(x, y), \beta) \quad \text{Formula (2)}$$

$$Bv(x, y) = \alpha \frac{L \cdot N(x, y)}{D^2(x, y)} f(Bt(x, y), \beta) \quad \text{Formula (3)}$$

In Formulae (1) to (3), α represents the intensity of the virtual light source, β represents the spread characteristics of the virtual light source, and L represents a direction vector of the virtual light source relative to the object. Meanwhile, N(x,y) represents a normal line of the object plane at a pixel position (x,y), and D(x,y) represents a distance between the virtual light source and the object at a pixel position (x,y). f(Rt(x,y),β) f(Gt(x,y),β) and f(Bt(x,y),β) represent the reflection color components of the object smoothed by the smoothing processing unit 603 in accordance with the spread characteristics β of the virtual light source, and correspond to the aforementioned Ra, Ga, and Ba.

The virtual light source processing unit 604 adds the estimated reflection color components (Rv, Gv, Bv) to the pixel signals (Rt, Gt, Bt) output from the degamma processing unit 602, and adds the relighting effect provided by the virtual light source to the pixel being processed. In other words, the virtual light source processing unit 604 generates processed pixel signals (Rout, Gout, Bout) through the operations of the following Formula (4) to (6) and outputs those signals to the gamma processing unit 606.

$$Rout(x,y)=Rt(x,y)+Rv(x,y) \quad \text{Formula (4)}$$

$$Gout(x,y)=Gt(x,y)+Gv(x,y) \quad \text{Formula (5)}$$

$$Bout(x,y)=Bt(x,y)+Bv(x,y) \quad \text{Formula (6)}$$

Furthermore, the virtual light source processing unit 604 generates an edge compensation signal ACt(x,y) by applying a two-dimensional filter that extracts a specific frequency component corresponding to an edge portion of the image, for example, for the pixel signals (Rt, Gt, Bt) output from the degamma processing unit 602. Then, by applying correction based on the spread characteristics of the virtual light source to the edge compensation signal ACt(x,y), the virtual light source processing unit 604 generates an edge compensation signal ACout(x,y) for correcting sharpness that has degraded due to the relighting process while ensuring the characteristics of the virtual light source.

Here, edge compensation according to the present embodiment, which takes into consideration the spread characteristics of the virtual light source, will be described. Generally, in the case where an image is shot with illumination light scattered using a diffuser or the like, the reflected light is not intense, which results in a low amplitude for edge portions, and a low-sharpness image is obtained as a result. On the other hand, in the case where an image is shot with highly-straight illumination light, such as when shooting with a bare bulb, the reflected light is intense, which results in a high amplitude for edge portions, and a high-sharpness image is obtained as a result.

Accordingly, in the present embodiment, a more natural relighting effect is added by correcting edges taking into consideration the spread characteristics (β) of the virtual light source used in the relighting process. In other words, the edge compensation is carried out so that the amplitude of the edge portions decreases in the case where a virtual light source having high diffusivity characteristics is used, and is carried out so that the amplitude of the edge portions increases in the case where a virtual light source having low diffusivity characteristics (high straightness) is used.

The virtual light source processing unit 604 according to the present embodiment finds a magnitude Mv(x,y) of the amplitude of the edge compensation signal at a pixel position (x,y) through the following Formula (7).

$$Mv(x, y) = \alpha \frac{L \cdot N(x, y)}{D^2(x, y)} f(Mt(x, y), \beta) \quad \text{Formula (7)}$$

In Formula (7), α represents the intensity of the virtual light source, β represents the spread characteristics of the virtual light source, and L represents a direction vector of the virtual light source relative to the object. Meanwhile, N(x,y) represents a normal line of the object plane at a pixel position (x,y), and D(x,y) represents a distance between the virtual light source and the object at a pixel position (x,y). f(Mt(x,y),β) represents the magnitude of the amplitude of the edge compensation signal generated from the pixel signals smoothed by the smoothing processing unit 603 in accordance with the spread characteristics β of the virtual light source, and corresponds to Ma.

Then, using the following Formula (8), the virtual light source processing unit 604 finds the edge compensation signal ACout(x,y) in which the characteristics of the virtual light source are applied to the edge compensation signal ACt(x,y).

$$ACout(x,y)=ACt(x,y) \times Mv(x,y)/Mt(x,y) \quad \text{Formula (8)}$$

In Formula (8), Mt(x,y) represents the amplitude of ACt(x,y), and is a luminance value, for example.

The process of Formula (8) generates an edge compensation signal providing less edge enhancement when the set spread characteristics β of the virtual light source are higher (that is, when the diffusivity of the virtual light is higher), and providing more edge enhancement when the spread characteristics β are lower (that is, when the diffusivity of the virtual light is lower).

Note that the present embodiment has described a case where the sharpness is adjusted in accordance with the spread characteristics of the virtual light source, using amplitude control during edge compensation as an example. However, parameters aside from the amplitude may be controlled, as long as the essence of the control is that processing parameters for adjusting the sharpness of the image are controlled in accordance with the spread characteristics of the virtual light source (the diffusivity or straightness of the virtual light). In other words, the method of controlling the processing parameters for adjusting the sharpness of the image in accordance with the spread characteristics of the virtual light source (the diffusivity or straightness of the virtual light) is not limited to the above example.

Figure 4A:
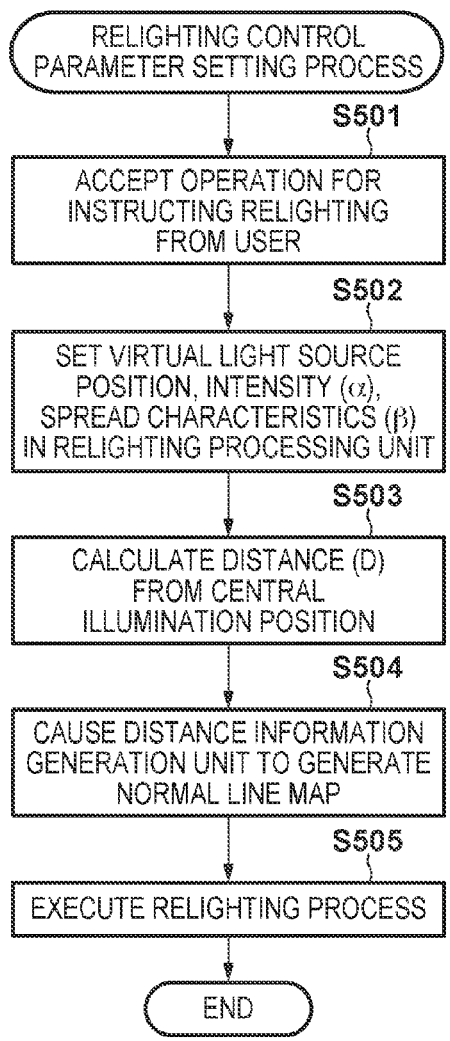
FIGS. 4A and 4B are flowcharts illustrating a process for adding a relighting effect according to an embodiment.
Figure 4B:
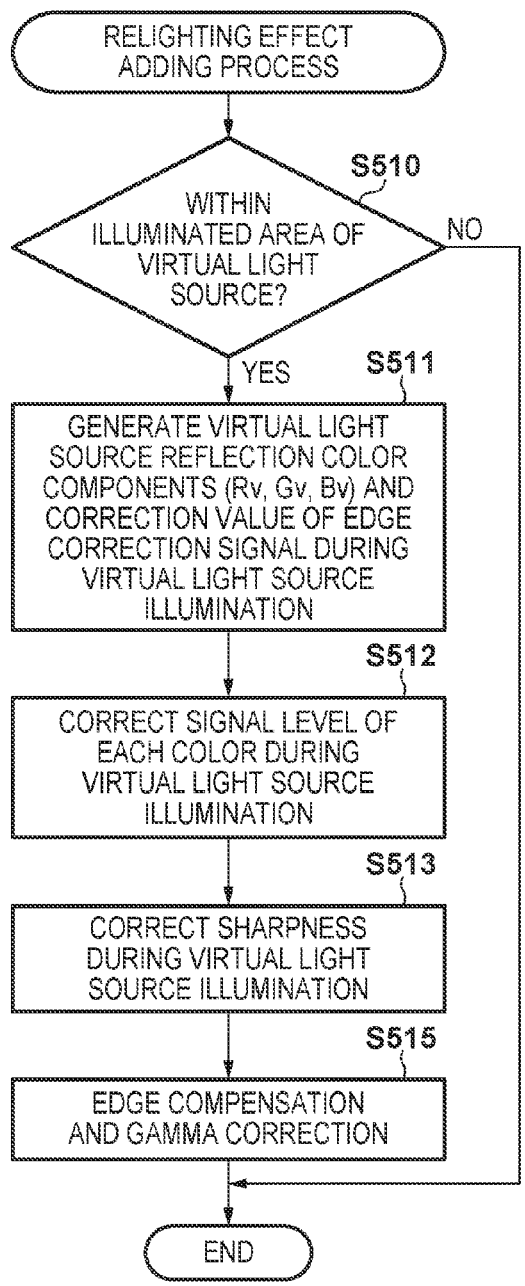

Next, operations in the process for adding the relighting effect performed by the relighting processing unit 114 mentioned above, and particularly operations of the smoothing processing unit 603, the virtual light source processing unit 604, and the gamma processing unit 606, will be described in detail using the flowchart illustrated in FIG. 4B.

The relighting effect is added to the input image on a pixel-by-pixel basis, and thus the operations described below are assumed to be carried out on a pixel being processed (a pixel of interest) unless otherwise specified. However, processing that requires the values of peripheral pixels of the pixel of interest, such as spatial filtering processes, uses such pixels aside from the pixel being processed.

In S510, the virtual light source processing unit 604 determines whether or not the pixel of interest is located within the illuminated area of the virtual light source. In the present embodiment, the system control unit 50 calculates the distance D from the central illumination position 702 (FIG. 3A) on a pixel-by-pixel basis in S503 (FIG. 4A). As such, the virtual light source processing unit 604 determines that the pixel of interest is within the illuminated area in the case where the distance D of the pixel of interest is no greater than a threshold set in accordance with the spread characteristics of the virtual light source, the distance between the virtual light source and the object, or the like, and advances the process to S511; in the case where the distance D is greater than the threshold, the pixel of interest is determined to be outside the illuminated area, and the process ends.

In S511, the reflection color components (Rv, Gv, Bv) of the virtual light and the edge compensation signal ACt are generated by the smoothing processing unit 603 and the virtual light source processing unit 604. To be more specific, the following processing is carried out.

The smoothing processing unit 603 smoothes the signals (Rt, Gt, Bt) of the pixel of interest and outputs the smoothed pixel signals (Ra, Ga, Ba) to the virtual light source processing unit 604.

The virtual light source processing unit 604 calculates the reflection color components (Rv, Gv, Bv) of the virtual light at the pixel of interest from the smoothed pixel signals (Ra, Ga, Ba) input from the smoothing processing unit 603 and the control parameters input from the system control unit 50.

Note that the control parameters are position information of the virtual light source, the intensity (α) of the virtual light source, the spread characteristics (β) of the virtual light source, the distance (D) from the central illumination position of the virtual light source, and three-dimensional shape information (N) of the object.

The virtual light source processing unit 604 generates the edge compensation signal ACt from the signals (Rt, Gt, Bt) of the pixel of interest.

In S512, the virtual light source processing unit 604 adds the reflection color components (Rv, Gv, By) of the virtual light found in S511 to the signals (Rt, Gt, Bt) of the pixel of interest, and adds the relighting effect provided by the virtual light. The virtual light source processing unit 604 then outputs the pixel signals (Rout, Gout, Bout) to which the relighting effect has been added to the gamma processing unit 606.

In S513, the virtual light source processing unit 604 corrects the edge compensation signal ACt on the basis of the spread characteristics of the virtual light source, generates the post-correction edge compensation signal ACout, and outputs that signal to the gamma processing unit 606. To be more specific, the following processing is carried out.

The smoothing processing unit 603 generates the edge compensation signal from the smoothed pixel signals (Ra, Ga, Ba), calculates the amplitude value Ma ($=f(Mt(x,y),\beta)$) thereof, and outputs that value to the virtual light source processing unit 604.

The virtual light source processing unit 604 generates the post-correction edge compensation signal ACout from the edge compensation signal ACt and the amplitude value Mt thereof, and Mv, in which the spread characteristics of the virtual light are applied to Ma, which is input from the smoothing processing unit 603.

In S514, the gamma processing unit 606 carries out edge compensation on the pixel signals (Rout, Gout, Bout) output from the virtual light source processing unit 604 by referring to the edge compensation signal ACout, and compensates for a drop in resolution feel caused by the relighting process. The gamma processing unit 606 then applies predetermined gamma correction, and outputs pixel signals (R'out, G'out, and B'out) to the luminance/color difference signal generation unit 607. The luminance/color difference signal generation unit 607 generates and outputs the luminance signal Y and the color difference signals R-Y and B-Y from the pixel signals (R'out, G'out, and B'out). The processing for the pixel being corrected is completed through the process described thus far. The stated processing is then applied to each pixel in the input image.

The system control unit 50 accumulates the luminance and color difference signals output by the relighting processing unit 114 in the image memory 106 under the control of the memory control unit 107. Then, when the relighting process is complete for the entire input image, the system control unit 50 compresses/encodes the image using the codec unit 110 and records the image in the recording medium 112 via the I/F 111.

As described thus far, according to the present embodiment, setting the virtual light source and carrying out edge compensation on the image to which the relighting effect has been added makes it possible to correct a drop in sharpness caused by the addition of the relighting effect. In particular, carrying out the edge compensation taking the diffusivity of the virtual light into consideration makes it possible to realize edge correction that matches the characteristics of the virtual light source, providing favorable image quality.

For example, the intensity of the edge compensation is lower in the case where the diffusivity of the virtual light is high than in the case where the diffusivity is low, and conversely, the intensity of the edge compensation is higher in the case where the diffusivity of the virtual light is low; as such, sharpness correction that matches the characteristics of the virtual light can be realized.

Other Embodiments

Although the present embodiment describes a case where the object present in the illuminated area of the virtual light is a person as an example, other objects may be employed as well. In addition, although the present embodiment describes a relighting process that brightens pixels in the illuminated area of the virtual light source, the invention can be applied in the same manner in the case where the pixels are darkened as well. Furthermore, the method of calculating the color reflection components (Rv, Gv, Bv) of the virtual light is not limited to the method described in the present embodiment, and another method may be used instead.

Further still, although the control coefficient is inversely proportional to the square of the distance D between the pixel of interest and the central illumination position when controlling the amplitude of the edge compensation signal in accordance with the illumination characteristics of the virtual light source, for example, the distance D may be made inversely proportional, the intensity may be set to change in the manner of a Gaussian distribution, and so on.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-048494, filed on Mar. 11, 2015, which is hereby incorporated by reference herein in its entirety.

What is claimed is:

1. An image processing apparatus comprising:
one or more processors;
a memory that stores a program executable by the one or more processors;
wherein the program, when execute by the one or more processors, causes the one or more processors to function as:
a correction unit configured to correct the brightness of a pixel included in an area, which is illuminated by virtual light of an image;
a generating unit configured to generate, on the basis of illumination characteristics of the virtual light, a correction signal for correcting sharpness of the area of the image; and
an application unit configured to apply the correction signal to the image;
wherein:
the illumination characteristics are spread characteristics;
the generating unit generates the correction signal for correcting the sharpness at a strength that corresponds to a degree of spread of the virtual light; and
in the case where the degree of the spread of the virtual light is a second degree that is greater than a first degree, the generating unit generates the correction signal for correcting the sharpness with more strength in the case of the second degree than in the case of the first degree.

2. An image processing apparatus comprising:
one or more processors;
a memory that stores a program executable by the one or more processors;
wherein the program, when execute by the one or more processors, causes the one or more processors to function as:
a correction unit configured to correct the brightness of a pixel included in an area, which is illuminated by virtual light, of an image;
a generating unit configured to generate, on the basis of illumination characteristics of the virtual light, a correction signal for correcting sharpness of the area of the image; and
an application unit configured to apply the correction signal to the image;
wherein:
the illumination characteristics are spread characteristics;
the generating unit generates the correction signal for correcting the sharpness at a strength that corresponds to a straightness of the virtual light; and
in the case where the straightness of the virtual light is a second straightness that is higher than a first straightness, the generating unit generates the correction signal for correcting the sharpness with more strength in the case of the second straightness than in the case of the first straightness.

3. The image processing apparatus according to claim 2, further comprising:
an image capturing unit,
wherein the correction unit corrects the brightness of a pixel, included in the area, of an image obtained by the image capturing unit.

4. An image processing apparatus comprising:
one or more processors;
a memory that stores a program executable by the one or more processors;
wherein the program, when execute by the one or more processors, causes the one or more processors to function as:
a correction unit configured to correct the brightness of a pixel included in an area, which is illuminated by virtual light, of an image;
a generating unit configured to generate, on the basis of illumination characteristics of the virtual light, a correction signal for correcting sharpness of the area of the image;
an application unit configured to apply the correction signal to the image; and
an estimating unit configured to estimate a reflection color component of the virtual light at a pixel included in the area,
wherein the correction unit corrects the brightness of the pixel included in the area by applying the estimated reflection color component to the pixel included in the area.

5. A control method of an image processing apparatus, the method comprising:
correcting the brightness of a pixel included in an area, which is illuminated by virtual light, of an image;
generating on the basis of illumination characteristics of the virtual light, a correction signal for correcting sharpness of the area of the image; and
applying the correction signal to the image,
wherein:
the illumination characteristics are spread characteristics;
the generating generates the correction signal for correcting the sharpness at a strength that corresponds to a straightness of the virtual light; and
in the case where the straightness of the virtual light is a second straightness that is higher than a first straightness, the generating generates the correction signal for correcting the sharpness with more strength in the case of the second straightness than in the case of the first straightness.

6. A non-transitory computer-readable storage medium storing a program that causes at least one processor to function as an image processing apparatus comprising:
a correction unit configured to correct the brightness of a pixel included in an area, which is illuminated by virtual light, of an image;
a generating unit configured to generate, on the basis of illumination characteristics of the virtual light, a correction signal for correcting sharpness of the area of the image; and
an application unit configured to apply the correction signal to the image,
wherein:
the illumination characteristics are spread characteristics;
the generating unit generates the correction signal for correcting the sharpness at a strength that corresponds to a straightness of the virtual light; and
in the case where the straightness of the virtual light is a second straightness that is higher than a first straightness, the generating unit generates the correction signal for correcting the sharpness with more strength in the case of the second straightness than in the case of the first straightness.

7. An image processing apparatus comprising:
one or more processors;
a memory that stores a program executable by the one or more processors;
wherein the one or more processors, when execute the program, cause the image processing apparatus to perform:
correcting the brightness of a pixel included in an area, which is illuminated by virtual light, of an image;
obtaining information regarding spread characteristics of the virtual light;
automatically generating, using the information regarding spread characteristics of the virtual light, on the basis of illumination characteristics of the virtual light, a correction signal for correcting sharpness of the area of the image at a strength that corresponds to a degree of spread of the virtual light; and
applying the correction signal to the image.

8. The image processing apparatus according to claim 7, wherein the generating automatically generates the correction signal according to an equation that defines a relation between degrees of spread of the virtual light and strengths of sharpness.

* * * * *